United States Patent [19]

Chan

[11] Patent Number: 5,150,407

[45] Date of Patent: Sep. 22, 1992

[54] SECURED DATA STORAGE DEVICES

[76] Inventor: Steve S. C. Chan, P.O. Box 34620, Chicago, Ill. 60634

[21] Appl. No.: 807,976

[22] Filed: Dec. 16, 1991

[51] Int. Cl.[5] .............................................. H04L 9/00
[52] U.S. Cl. ............................................ 380/4; 380/25
[58] Field of Search ............................ 380/3, 4, 23, 25

[56] References Cited

U.S. PATENT DOCUMENTS 5,001,752 3/1991 Fischer .................................. 380/23

Primary Examiner—Thomas H. Tarcza
Assistant Examiner—David Cain

[57] ABSTRACT

A device for storing user data and a value representative of the time of storage is disclosed, which includes physically separating portions of an encryption key, combining a time stamp with user data, and using the restored encryption key to encrypt and decrypt the stamped user data.

11 Claims, 3 Drawing Sheets

SECURED DATA STORAGE DEVICES

FIELD OF THE INVENTION

This invention relates to data storage, and more particularly to a device for storing data and the time at which such data is stored and for preventing the alteration of the time and data stored therein.

BACKGROUND OF THE INVENTION

Recently, computer has become widely available to a large segment of the society. In addition, the price of various computer related digital storage media, such as floppy diskettes and hard disks, have dropped drastically. As a result, computer has become the primary device for data entry and data storage in many applications.

One of the advantages of using digital storage media for storing data is that the data stored therein can be retrieved quickly. Another advantage of using digital storage media is that the amount of information which can be stored in a given volume of storage medium is many order of magnitude more than that can be stored in traditional storage media such as papers.

However, there are problems in using digital storage media. One of the problems in using the digital storage media for data storage is that the information stored therein can be altered easily. As a result, it is very difficult to verify the authenticity of the data stored in the computer.

One example where it is important to preserve the authenticity of the data is in accounting. Standards of accounting auditing, such as those promulgated by the Auditing Standards Board of the American Institute of CPAs, require that the integrity of the accounting data be investigated in every audit. Typically, accounting data is recorded in chronological order in a journal. If an error in recording is discovered later, a separate journal entry correcting the error is made at the time of discovery instead of altering the erroneous entry. Thus, once a journal entry is made, there is no need to alter the entry even though the entry is later found to be erroneous. Consequently, it is desirable to use a data storage device such that the data stored therein cannot be altered. The use of such a device goes a long way towards preserving the integrity of the data stored therein.

In addition to protecting the integrity of the data stored in a storage medium, it is also desirable to know the time at which the data is being stored. As an example, many organizations routinely stamp the receiving date on every correspondence received. This procedure, if carried out consistently, could have evidentiary value in a legal proceeding. It would be equally desirable to have a data storage device which automatically "stamp" the date when a piece of data is being stored in the device such that both the data and the date cannot be altered.

There are storage media, popularly known as "Write Once Read Many" media, such that the physical media change physically at the place where data have been written on it. This change is not reversible. Thus, once data is written on one of these media, the data is available only for reading and cannot be altered.

The availability of these "Write Once Read Many" media does not provide a solution to the problems mentioned above. Even though the data written on a "Write Once Read Many" medium cannot be altered, nothing prevents a person from substituting the original physical medium with a different physical medium containing altered data. Thus, it is difficult to convince a third party, such as an auditor, of the authenticity of the data recorded in such physical medium because it is difficult to know if the physical medium being inspected by the third party is the original physical medium.

Similarly, the "Write Once Read Many" media do not provide a means to verify the time at which the data is stored in the media. This is because the time written in the media by the computer, just like other data, can be altered by recording the data again on a different "Write Once Read Many" media accompanying with a new time.

Another method to improve the integrity of the data stored in a computer is to limit the access of the computer, such as using passwords, to authorized persons in an organization. As a result, only these authorized persons are able to alter the information in the computer. Further, various encryption schemes can be applied to the data so that only those persons who possess the key of the encryption scheme is able to alter the data. However, in those situations where it is necessary to verify beyond a reasonable doubt that no person, authorized or not, is able to alter the data, limiting the access or the use of encryption scheme would not suffice to remove the possibility that one of the authorized persons may have altered the information stored in the computer.

SUMMARY OF THE INVENTION

Broadly stated, the present invention is a device for storing user data and a value representative of the time of storage. It comprises a storage means for storing data. The storage means has a first storage area for storing a first portion of a first key. The device also comprises a clock means for keeping time continuously and means for generating a value representative of the time indicated by the clock means. The device further comprises a first key storage means for storing a second portion of the first key. The first key storage means is separated from the storage means. The device comprises a means for generating a set of combined data by combining the user data and the value representative of time. The device also comprises a means for generating a set of encoded data in response to the set of combined data as a function of the first portion and the second portion of the first key. The device further comprises an encoded data storage means for storing the set of encoded data in the storage means in response to a first user command. The device also comprises a means for retrieving the set of encoded data from the storage means in response to a second user command. The device comprises a means for decoding the encoded data as a function of the first portion and the second portion of the first key.

It is therefore an object of the present invention to provide a data storage device.

It is another object of the present invention to provide a data storage device for storing user data and the time of storing the user data in the device.

It is a further object of the present invention to provide a data storage device such that it is difficult to alter the user data and the time of storing.

These and other objects of the present invention will become apparent to those skilled in the art from the following detailed description of the invention and the accompanying drawings.

DETAILED DESCRIPTION OF THE INVENTION

Figure 1:
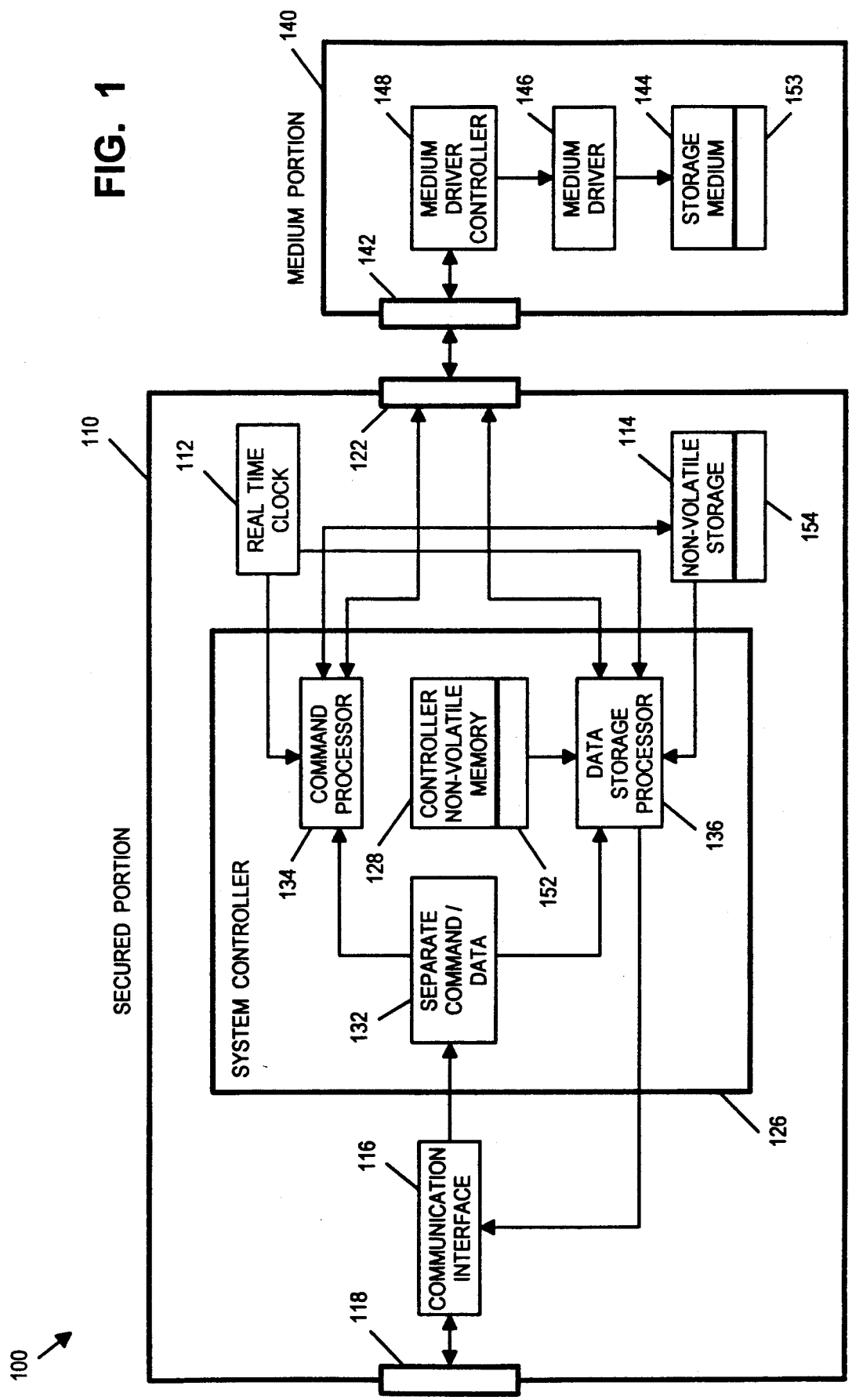
FIG. 1 is a block diagram of a data storage device according to the present invention.

FIG. 1 shows a block diagram of a data storage device 100 according to the present invention. Data storage device 100 comprises a secured portion 110 and a medium portion 140. Secured portion 110 includes components, described below, enclosed inside a secured enclosure such that these components are preferably not physically accessible from outside. The communication between secured portion 110 and the outside is through two ports 118 and 122. Secured portion 110 accepts data and commands from users through port 118. The processed data, including the attachment of the time data is entered into data storage device 100, is send through port 122 to medium portion 140 for storage. In addition, secured portion 110 could also issue commands to medium portion 140. Medium portion 140 accepts the processed data and command from secured portion 110 through an input port 142. Medium portion 140 preferably comprises a storage medium 144, a medium driver 146 for controlling storage medium 144, and a medium driver controller 148 for controlling the operation of medium driver 146. Medium portion 140 is conventional. Medium portion 140 is preferably a conventional random access read/write storage medium such as a hard disk medium or a floppy diskette. The components of medium portion 140 are widely available and are well known in the art.

There are many advantages in allowing the use of conventional storage media. One of the advantages is that the user can make backup copies of the data stored therein. As a result, the security of the data is improved because these backup copies could remain intact even if data storage device 100 is destroyed. Another advantage is that only a small part of data storage device 100, in this case, secured portion 110, needs to be securely protected from external access. Thus, the cost of the device is lower. A further advantage is that conventional storage media are much less expensive and more reliable than exotic storage media.

Secured portion 110 comprises a battery powered real time clock (RTC) 112, a nonvolatile storage 114, a communication interface 116 coupled to port 118, and a system controller 126. RTC 112 generates a signal representative of the time. RTC 112 should continue to keep track of the time even though the main power to data storage device 100 is turned off. Nonvolatile storage 114 comprises means for storing information relating to the adjustment of time, as explained below. Nonvolatile storage 114 is preferably a semiconductor nonvolatile memory device. Communication interface 116 includes the hardware and the software used for communicating with the users, such as accepting data from the user for storage, transmitting the stored data to the user, and accepting commands from the user. System controller 126 is connected to communication interface 116, RTC 112, and nonvolatile memory 114 inside secured portion 110. System controller 126 converts the input user data into a coded bit sequence suitable for outputting to medium portion 140 for storage. System controller further recovers the user data and the creation time of the coded bit sequence from the coded bit sequence retrieved from medium portion 140.

System controller 126 comprises a controller nonvolatile memory 128 for storing algorithm and system parameters, a means 132 for separating commands from data, a command processor 134, and a data storage processor 136. Communication interface 116 accepts input, which could be data or commands, from the user and couples the input to means 132 for separating commands from data. The commands are sent to command processor 134 while the data is routed to data storage processor 136. At the same time, the output from RTC 112 is coupled to both the command processor 134 and data storage processor 136. Command processor 134 may also generates commands for controlling medium portion 140. Examples of some of the commands are a "format" command for instructing medium portion 140 to format storage medium 144 for storing data, a "backup" command for backing up the data from one storage medium 144 to another storage medium, a "save" command for saving the user data together with the time to storage medium 144, and a "retrieval" command for retrieving the user data stored in storage medium 144.

Data storage processor 136 combines the input user data from communication interface 116, the time from RTC 112, and a set of system parameters stored in controller nonvolatile memory 128 and storage medium 144 to generate a coded bit sequence representative of the user data and the time at which the data is entered into data storage device 100. This coded bit sequence is sent to medium portion 140 through port 122.

When it is desirable to recover the user data, the coded bit sequence is retrieved from medium portion 140 and sent to data storage processor 136 via port 122. Data storage processor 136 processes coded bit sequence and recovers the original user data and the time when the coded bit sequence was created. The original user data together with the time of creation are sent to communication interface 116 for transmitting to the user.

Since the coded bit string is stored in a conventional storage medium, the sequence can be read and altered by the user. In order to ensure that the user could not alter the coded bit sequence to his liking, the coded bit sequence should appear as a random sequence to the user. Thus, the user does not know how to create the coded bit sequence for the data he desires. Further, the coded bit sequence should depend on the time at which the user data is entered. Thus, the same user data input to data storage device 100 would generate a different coded bit sequence depending on the time the data is entered because the time of data entering is one of the parameter for generating the sequence. Thus, if the user uses data storage device 100 to generate a coded bit sequence for the data he desires at a time different than the time of entry of the original data, he cannot delete the coded bit sequence generated earlier and replace it with this newly generated bit sequence. This is because the newly generated bit sequence contains information indicating that the data is created at a time different from the originally created bit sequence.

The algorithm for generating the coded bit sequence and the system parameters used in the algorithm should be kept secret. Consequently, secured portion 110 is preferably sealed so that the user do not have access to the components inside. Controller nonvolatile memory 128 is preferably of a form such as the algorithm and system parameters can only be read by data storage processor 136 and cannot be read externally. In this case, even if the user physically breaks open secured portion 110, they still do not have access to the algorithm. An example of such a nonvolatile memory is contained in a microcontroller MCS 8051AHP manufactured by Intel. The microcontroller consists of a "locking" bit which when programmed denies electrical access by any external means to the on-chip nonvolatile memory, i.e., the on-chip nonvolatile memory cannot be read out or executed out of external memory.

The coded bit sequence could be generated using conventional data encryption algorithms. Typically, the encryption algorithm performs a series of complicated operations on the data such that the resulting coded bit sequence appears to be random. The amount of time spent in conventional encryption may be too long if a low cost microprocessor is used to generate a reasonable secure coded bit sequence. One aspect of the present invention uses two separate steps to "randomize" the data. The first step is a simple data encoding step which changes the user data into an encoded data. This step can be carried out using conventional encryption algorithms which do not necessarily require lengthy computation procedure. The second step is a physical data distribution step which distributes the continuous string of encoded data into different physical locations on storage medium 144. Thus, even though the encoded data using simple encryption algorithms may be less secure, the distribution of the encoded data offer an additional level of protection. In many cases, the performance provided by this two-level protection is just as good as those provided by elaborate data encryption algorithms without data distribution.

Each of the steps for generating the encoded data and for distributing the data preferably involve a "key". In the simplest case, this key could be a look-up table. In the more complicated case, this key could be seed value for generating a sequence of pseudo-random numbers. One aspect of the invention separates the key into two portions. One portion is stored in a location 152 inside controller nonvolatile memory 128 and the other portion is stored in location 153 of storage medium 144. The portion of the key stored in location 152 of controller nonvolatile memory 128 is preferably the same for all data storage devices while the portion of the key stored in location 153 of storage medium 144 is preferably different for each storage medium. The advantage of storing a portion of the key in the storage medium is that each data storage device generates its own set of encoded data. Thus, a user cannot use one data storage device to generate the coded bit sequence for another data storage device. The advantage of storing a portion of the key in controller non-volatile memory 128 is that this portion of the key is not accessible by a user. Thus, even though the portion of the key stored in the storage medium may be read, for example, by using an utility software such as Norton Utilities, the user still do not have the full key.

Turning now to the other parts of secured portion 110, RTC 112 should be able to keep track of the time even when the main power to data storage device 100 is turned off. A battery having long shelf life, such as a lithium battery, is preferably used to power RTC 112.

In addition, if a battery which allows charging is used, a circuit is preferably included which could charge the battery when the main power of data storage device 100 is turned on. Thus, the life of the battery could be extended. Such charging circuit is well known in the art.

Each time data storage device 100 is turned on, the time indicated by RTC 112 is stored in a location 154 in non-volatile memory 114. One way to check the integrity of RTC 112 is to compare the time indicated by RTC 112 at each power-on with the time indicated by RTC 112 and stored in location 154 at the previous power-on. If the time at the current power-on is less than the time of the previous power-on stored in location 154 of non-volatile memory 114, it can be concluded that RTC 112 malfunctions and data storage device 100 should signal the user about the problem.

It is known that a real time clock does not have perfect accuracy. Thus, it is possible that the time shown by RTC 112 could deviate from the correct time. Consequently, the user is preferably allowed to adjust the time indicated by RTC 112 by issuing adjustment commands to command processsor 134. Command processor 134 then stores such adjustment information into non-volatile memory 114. This information will be used by data storage processor 136 to determine the correct time. However, there should be limitations to the adjustment of time by the user to maintain the integrity of the time information, as explained below.

RTC 112 typically has a maximum error rate in maintaining time. This maximum error rate could be estimated based on the tolerance of the components used in RTC 112 and the environment in which data storage device 100 is allowed to exposed to. The maximum amount of adjustment by the user should not exceed the maximum deviation calculated using this maximum error rate. As an example, if the maximum error rate is 10 parts per million, the amount of adjustment can be no more than 1 second every day, i.e., 86,400 seconds, starting from the time of calibration at the factory. The time of calibration and the maximum error rate is preferably written into nonvolatile memory 114 before data storage device 100 is released to the user.

After the user has adjusted the time through command processor 134, the maximum error rate could also be used to restrict further adjustments based on this adjusted time. That is, the amount of the next adjustment should not exceed the maximum deviation from the time of the previous adjustment calculated using the maximum error rate. In order to keep track of these adjustments, they are written into nonvolatile memory 114.

In one embodiment of the present invention, a hard disk is used as the storage medium. The physical structure of a hard disk typically includes a certain number of cylinders. Each cylinder is further divided into a plurality of physical sectors having a fixed number of bytes. Thus, the total number of physical sectors is equal to the product of the number of cylinders and the number of physical sectors per cylinder. The hard disk can also be considered as organized into a continuous sequence of logical sectors. The total number of logical sectors is the same as the total number of physical sectors. Each logical sector has the same number of bytes as the physical sector. Thus, the logical structure has the same storage capacity as the physical structure.

The distribution of the encoded data to physical sectors in the hard disk follows a two step process. First, the encoded data is stored as a file which preferably occupies a set of contiguous logical sectors. If the file does not occupies contiguous logical sectors, pointers could be used to link the logical sectors comprising the file. Second, the logical sectors are then distributed to the corresponding physical sectors using a mapping alogorithm having a key with a first portion and a second portion. This mapping algorithm is preferably kept as a secret. After the mapping, the initial file structure is now "randomized".

The hard disk can be used to store a plurality of files. Preferably, the files are organized into directories as is conventionally in the art. A predetermined location in the hard disk, preferably sector number 0, is used to store the portions of the encoding and distributing keys stored in the storage medium. In addition, the time of formation the hard disk is also stored in sector number 0. This location preferably also stores the next available logical sector number for storing encoded data for the next set of user data.

Figure 2:
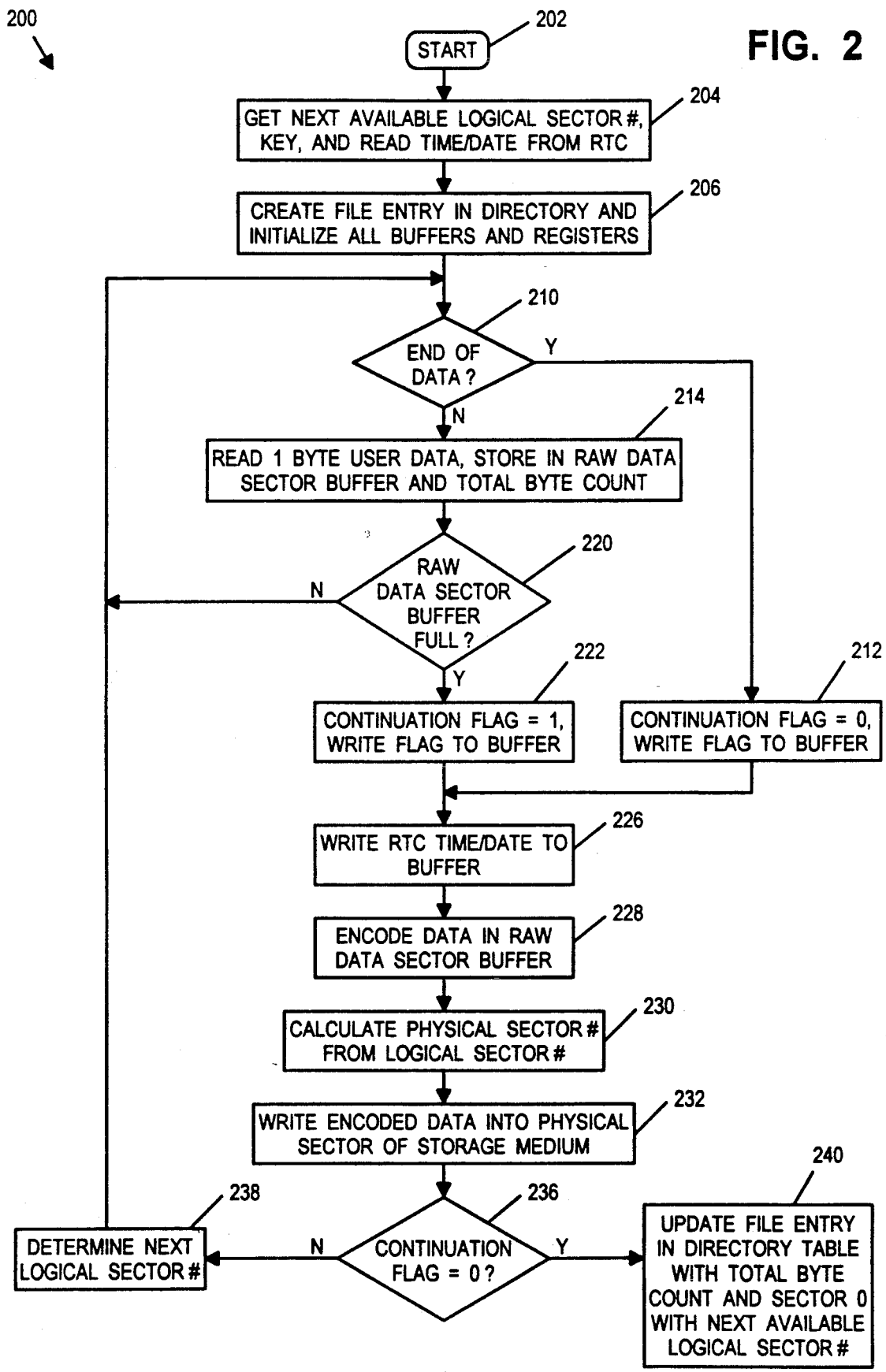
FIG. 2 is a flow chart showing the generation of a coded bit sequence and the storing of the sequence in a hard disk according to the present invention.

FIG. 2 is a flow chart 200 showing the generation of the coded bit sequence stored in the hard disk. Flow chart 200 starts at step 202. At step 204, the next available logical sector for storing the current set of user data and the portion of the keys stored in sector number 0 of the hard disk is read from the hard disk. The portion of the keys stored in controller non-volatile memory 128 and the adjusted time of RTC 112 is also read from secured portion 110. At step 206, a file entry in the directory is created. At this time, a continuation flag register, a total byte count register, a raw data sector buffer, and an encoded data sector buffer used flow chart 200 are set to their initial values. At step 210, flow chart 200 determines whether all the user data have been read. If the answer is affirmative, flow chart 200 branches to step 212. In step 212, the content of the continuation flag register is set to zero indicating that no more user data need to be read. If the answer in step 210 is negative, flow chart 200 branches to step 214 which reads one byte of user data and store the data into an area of random access memory designated the raw data sector buffer. In addition, step 214 also increases a total byte count register for storing the total number of bytes of the user data being read. In step 220, flow chart 200 determines whether the raw data sector buffer is full. If the answer is negative, step 220 branches back to step 210. Thus, more user data is read. If the answer is affirmative, step 220 branches to step 222. The continuation flag is set to one indicating that more user data need to be processed.

Step 226 writes the time information obtained in step 204 to the raw data sector buffer. In step 228, the bytes in the raw data sector buffer are encoded using the keys stored in controller non-volatile memory 128 and in the hard disk. The encoded data is stored in an encoded data sector buffer. The encoding algorithm perferably depends on the time of formatting the hard disk and the logical sector number assigned to store this data. Since the time of formatting the hard disk is probably different for different data storage device, each data storage device would generate a different set of encoded data from the same set of raw data.

In step 230, the cylinder number and the physical sector number are calculated using the other set of keys stored in controller non-volatile memory 128 and in the hard disk. In step 232, the encoded data is written into the calculated cylinder number and the calculated physical sector number of the hard disk. The algorithm for calculating the physical storage location preferably depends on the time of formatting the hard disk, the logical sector number assigned to store this data. In addition, the positions of the individual bytes in the encoded data sector buffer is preferably further "randomized" before writing to the physical sector.

In step 236, flow chart 200 examines the continuation flag. If the flag has a value of one indicating that more user data need to be process, flow chart 200 branches to 238. The next logical sector number for this file is determined. If logical sector number are assigned sequentially, the next logical sector number is increased by one. However, other alogorithm for assigning logical sector numbers to a file can also be used. Flow chart 200 then returns to step 210 for further processing of the user data. If the flag has a value of zero indicating that no more user data need to be read, flow chart 200 branches to step 240. Information relating to this file such as the time of creation obtained in step 204, and the value of the first logical sector of the file is entered into the file entry of the directory table. The next available logical sector number for other files, stored in sector 0, is updated. Data storage device 100 is now ready to accept another set of data and stores the set of data in other file.

Figure 3:
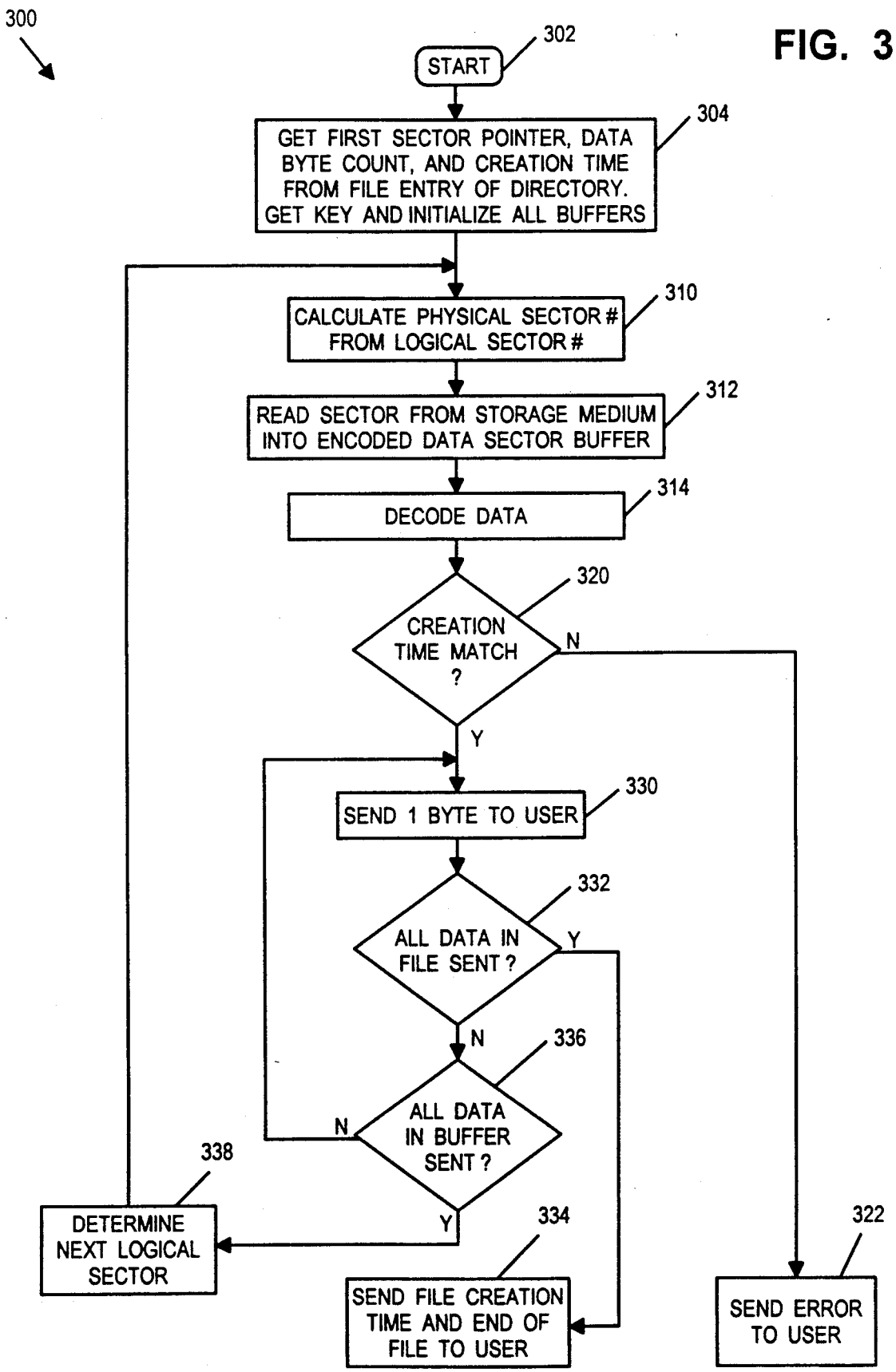
FIG. 3 is a flow chart showing the retrieval of user data from the hard disk according to the present invention.

FIG. 3 is a flow chart 300 showing the retrieval of user data from the hard disk. Flow chart 300 starts at step 302. At step 304, information relating to the file such as the time of creation and the first logical sector number of the file is read from the file entry of the directory table. In addition, the portion of the keys stored in sector number 0 of the hard disk and the portion of the keys stored in controller non-volatile memory 128 is read from secured portion 110. Further, a retrieved data buffer and an encoded data sector buffer used in flow chart 300 is set to its initial values. In step 310, the physical cylinder and the physical sector number is calculated from the first logical sector number of file. In step 312, the encoded data stored in this sector is retrieved into the encoded data sector buffer. In step 314, the retrieved data is decoded and stored into the retrieved data buffer. In step 320, the creation time determined from this sector is compared with the creation time stored in the file entry. If there is a mismatch, step 320 branches to step 322 and data storage device 100 sends an error message to the user. If the two times are the same, flow chart 300 branches to step 330. Data storage device 100 sequentially sends the decoded bytes stored in retrieved data buffer to the user. In step 332, flow chart 300 determines whether all the data in file has been sent. If the answer to step 332 is affirmative indicating that all the data in the file has been sent to the user, flow chart 300 branches to step 334. Data storage device 100 sends the creation time and an end of file symbol to the user. If the answer to step 332 is negative indicating that there are additional data, flow chart 300 branches to step 336. Flow chart 300 now determines whether all the data in the retrieved data buffer have been sent. If the answer is negative, flow chart 300 branches back to step 330. If the answer is affirmative, step 336 branches to step 338. In step 338, the value of the next logical sector for the file is determined. Flow chart 300 then flows back to step 310. Flow chart 300 continues until all the decoded data are sent to the user.

Various modifications of the invention, in addition to those shown and described herein, will become apparent to those skilled in the art from the foregoing description and accommpanying drawings. Such modifications

What is claimed is:

1. A device for storing user data and the time of storage of the user data comprising:

storage means for storing data, said storage means having a first storage area for storing a first portion of a first key;

clock means for keeping time continuously;

means for generating a value representative the time indicated by said clock means;

first key storage means for storing a second portion of said first key, said first key storage means being physically separated from said storage means;

means for generating a set of combined data by combining the user data and said value representative of the time;

means for generating a set of encoded data in response to said set of combined data as a function of said first portion and said second portion of said first key;

encoded data storage means for storing said set of encoded data in said storage means in reponse to a first user command;

means for retrieving said set of encoded data from said storage means in response to a second user command; and means for decoding said encoded data as function of said first portion and said second portion of said first key.

2. The device of claim 1 wherein said encoded data storage means further includes means for distributing said set of encoded data to different storage locations in said storage means.

3. The device of claim 2 wherein said storage means further comprises a second storage area for storing a first portion of a second key and wherein said means of distribution futher comprises second key storage means for storing a second portion of said second key, said second key storage means being separated from said storage means, said means for distributing being a function of said first and said second portions of said second key.

4. The device of claim 1 wherein said means for generating the value representative of the time further comprising:

means for allowing a user to perform an adjustment to the time and data; and means for limiting said adjustment to below a predetermined maximum deviation.

5. The device of claim 4 wherein said predetermined maximum deviation being a function of a maximum error rate of said clock means.

6. The device of claim 1 further comprising a secured enclosure for housing said means for generating the value representative of said time and data, said first key storage means, said means of generating said set of combined data, and said means of generating said set of encoded data.

7. The device of claim 1 wherein said first key storage means and said means of generating said set of encoded data are stored in a digital device which denies electrical access by external means.

8. The device of claim 1 wherein said means for generating said set of encoded data being further a function of the time for formatting said storage means.

9. The device of claim 1 wherein said storage medium is organized into logical sector numbers and wherein said means for generating said set of encoded data is further a function of said logical sector numbers.

10. The device of claim 2 wherein said means for distributing being further a function of the time for formatting said storage means.

11. The device of claim 2 wherein said storage medium is organized into logical sector numbers and wherein said means for distributing is further a function of said logical sector numbers.

* * * * *